United States Patent [19]

Fraschini

[11] 4,354,385
[45] Oct. 19, 1982

[54] THERMOMETRIC COMPOSITIONS FOR MEASURING AND INDICATING LOW TEMPERATURES AND RELATED THERMOMETRIC DEVICES

[76] Inventor: Mario Fraschini, Via Valcuvia, N. 61, 21033 Cittiglio Varese, Italy

[21] Appl. No.: 213,644

[22] Filed: Dec. 5, 1980

[30] Foreign Application Priority Data

Feb. 6, 1980 [IT] Italy .............................. 19716 A/80

[51] Int. Cl.³ ...................... C09K 3/34; G01K 11/16; G01K 11/18
[52] U.S. Cl. ................................... 374/162; 116/216; 252/299.7; 252/316; 428/1
[58] Field of Search ............... 73/356; 252/299.7, 316; 428/1; 116/206, 207, 216, 217

[56] References Cited

U.S. PATENT DOCUMENTS

| | | | |
|---|---|---|---|
| 3,409,404 | 11/1968 | Fergason | 252/299.7 |
| 3,441,513 | 4/1969 | Woodmansee | 252/299.7 |
| 3,529,156 | 9/1970 | Fergason et al. | 252/299.7 |
| 3,576,761 | 4/1971 | Davis | 252/299.7 |
| 3,578,844 | 5/1971 | Churchill | 252/299.7 |
| 3,647,279 | 3/1972 | Sharpless et al. | 252/299.7 |
| 4,138,889 | 2/1979 | Fraschini | 73/356 |
| 4,301,054 | 11/1981 | Buirley et al. | 252/299.7 |

OTHER PUBLICATIONS

Alfassi, Z. B., et al., Mol. Cryst. Liq. Cryst., vol. 56, (Letters), pp. 127–131, (1979).
Gray, G. W., et al., *Liquid Crystals and Plastic Crystals*, vol. 1, John Wiley & Sons, Inc., New York, pp. 327–337, (1974).

*Primary Examiner*—Teddy S. Gron
*Attorney, Agent, or Firm*—Murray and Whisenhunt

[57] ABSTRACT

For the measurement and the indication of low temperatures, particularly between 0° C. and −30° C., there is foreseen a thermometric composition of cholesteric substances comprising, besides cholesteryl nonanoate, cholesteryl oleyl carbonate and cholesteryl chloride, cholesteryl acetate in an amount increasing with the increase from 0° C. to −30° C. of the temperature to be measured and indicated.

There are also contemplated thermometric indicating devices, particularly suitable for the measuring and indicating of the temperature of freezing cells.

8 Claims, No Drawings

THERMOMETRIC COMPOSITIONS FOR MEASURING AND INDICATING LOW TEMPERATURES AND RELATED THERMOMETRIC DEVICES

The present invention relates to thermometric compositions for the measurement and the indication of low temperatures, particularly temperatures of between 0° C. and −30° C. The invention further relates to a thermometric device of the so-called "liquid crystal" type, as obtained by means of the thermometric compositions of the present invention. There are known, since several years, liquid crystal devices for indicating and detecting the temperature, based on the property exhibited by some mesomorphic substances of the cholesteric type, which change their behaviour with respect to impringing white light as the temperature varies and which particularly change from a condition of total transparency to a condition in which have a coloured appearance when the temperature has a value comprised in a particular range, which is specific for each mesomorphic substance or composition of mesomorphic substances.

To date, all the known uses of this principle have been directed to the measurement and detection of temperatures having 0° C. as the lower limit, or little less than 0° C., whereby there have been made thermometers for the measurement of the room temperature, thermometers for the measurement of the body temperature, thermographich diagnostic devices, based on the variation of temperature of skin areas etc.

The attempts, as made up to date, for the measurement and the indication of low temperatures, lower than 0° C., have been unsuccessful, since, by having recourse to the known, compositions, the thermometer lacked a valuable precision, owing to the fact that the temperature intervals, to which the single compositions were sensitive and changed colour, became too much extended, thus covering a temperature range which was too wide to be of whatever practical usefulness.

For more information about the nature and the types of cholesteric substances and on their properties and behaviour reference can be made, for instance, to the U.S. Pat. No. 3,576,761.

In this patent, example II illustrates a series of thermometric compositions comprising, according to several proportions, cholesteryl chloride, cholesteryl oleyl carbonate and cholesteryl nonanoate: there is shown that, by varying the relative ratios, the colour change temperature varies between 35° C. and 48° C.

The main purpose of the present invention is that of providing a liquid crystal thermometric composition capable of measuring and detecting temperatures lower than 0° C. and particularly varying between 0° C. and −30° C.

Another purpose of the present invention is that of providing the desired precision and particularly a precision equal or higher than 3° C.

These purposes are achieved by means of a thermometric composition of cholesteric mesomorphic substances, characterized by comprising a quaternary mixture of cholesteryl nonanoate, cholesteryl oleyl carbonate, cholesteryl chloride and cholesteryl acetate. According to the preferred embodiment of the thermometric composition of the present invention, the afore said quaternary mixture comprises, essentially constant amounts of the three first mentioned components and the variation of the colour change temperature is provided by varying the concentration of cholesteryl acetate.

The thermometric devices according to the invention are prepared by the known technology of this field (for instance according to the U.S. Pat. No. 4,138,889), namely by applying the composition onto a support, for example of transparent plastic material, as a slurry of microcapsules containing the thermometric compositions, by evaporating the solvent, in order to fix the microcapsules onto the support, and by applying an outer transparent protecting layer; the bottom of the support is preferably coated with a substance suitable for affording the necessary contrast, in order to make easily viewable the microcapsules changing colour according to the temperature variations.

Of course the application of the microcapsules shall take place according to signes reproducing the thermometric information which must appear depending on the variation of the temperature.

The thermometric compositions and devices of the present invention find their main use in the refrigerating industry, particularly for refrigerating and deep freezing cells.

According to a specific embodiment of the invention there is foreseen a temperature indicating device, to be permanently secured to the inner wall of the door of a refrigerating cell, said indicating device being provided with a thermometrical composition changing colour at a temperature which is offset with respect to the temperature really existing within the refrigerating cell by an amount corresponding to the variation resulting from the heat conduction through the door of the cell. Otherwise stated, the indicating device does indicate a temperature corresponding to the temperature existing within the refrigerating cell but the thermometric composition changes its colour at a temperature which in this case is higher and is the temperature of the door of the cell.

In the following, two examples of thermometric compositions according to the invention are given, it being understood that these examples have only illustrative but non limiting purpose.

These compositions are given in form of a table, under the heading temperature there being indicated the temperature values at which the single mixture does change colour, taking a characteristic colour (variable from brown through green to blue).

TABLE 1

| Component* (g) | | | | Temperature |
| --- | --- | --- | --- | --- |
| CN | OCC | CCl | CAc | (°C.) |
| 29.8 | 55 | 15 | 2.8 | 0 |
| (29.05) | (53.61) | (14.62) | (2.73) | |
| 29.8 | 55 | 15 | 4.2 | −5 |
| (28.66) | (52.89) | (14.43) | (4.04) | |
| 29.8 | 55 | 15 | 6.2 | −10 |
| (28.12) | (51.89) | (14.16) | (5.85) | |
| 29.8 | 55 | 15 | 8.0 | −15 |
| (27.65) | (51.03) | (13.92) | (7.43) | |
| 29.8 | 55 | 15 | 10.0 | −20 |
| (27.39) | (50.56) | (13.79) | (9.11) | |
| 29.8 | 55 | 15 | 12.0 | −25 |
| (26.66) | (49.20) | (13.42) | (10.74) | |

*The values between brackets are expressed as percent by weight

In the preceding table:
CN = cholesteryl nonanoate
OCC = oleyl cholesteryl carbonate
CCl = cholesteryl chloride CAc=cholesteryl acetate Each composition is microencapsulated according to the techniques of the related art, by adding standard ingredients, such as for instance anti-oxidant agents.

It is also possible and foreseeable to adopt all the expedients known in the prior art as regards the manufacturing of thermometric devices.

In the table 2, there are reported, as an example, the compositions of the present invention particularly useful for thermometric indicating devices to be applied to the door of a refrigerating cell.

In the table the effective temperature limits are reported at which the single compositions change colour, these temperatures corresponding to internal values of the refrigerating cell which are lower by to 3° to 5° C.

TABLE 2

| Component* (g) | | | | Temperature |
|---|---|---|---|---|
| CN | OCC | CCl | CAc | (°C.) |
| 20 | 71 | 9 | 12.5 | −7 |
| (17.78) | (63.12) | (8.00) | (11.12) | |
| 18 | 69 | 9 | 13.5 | −10 |
| (16.44) | (63.02) | (8.22) | (12.33) | |
| 18 | 69 | 9 | 14.6 | −13 |
| (16.28) | (62.39) | (8.14) | (13.21) | |
| 18 | 69 | 9 | 15.7 | −16 |
| (16.12) | (61.78) | (8.06) | (14.06) | |
| 18 | 69 | 9 | 17.2 | −19 |
| (15.91) | (60.96) | (7.96) | (15.20) | |

*The values between brackets are expressed as percent by weight

From the preceding tables it is evident that, according to the preferred embodiment of the invention, the concentrations of three components of four are maintained essentially constant, whereas by increasing the concentration of the fourth component, namely cholesteryl acetate, the temperature of colour change becomes lower, without however modifying the precision of the measurement and consequently of the temperature indication.

It is however evident that it is also possible to vary the contents of the other components of the quaternary mixture, as well as to substitute for them other mesomorphic cholesteric substances having like properties and behaviour, in order to cover the whole range of desired or necessary temperatures.

I claim:

1. A thermometric composition of mesomorphic cholesteric substances suitable for the measurement and indication of low temperatures in the range of 0° C. to −30° C., said composition having a color change temperature within said range at which said composition changes color, said composition comprising a quaternary mixture of cholesteryl nonanoate, oleyl cholesteryl carbonate, cholesteryl chloride and cholesteryl acetate, said color change temperature being adjustable by varying the amount of cholesteryl acetate relative to said cholesteryl nonanoate, oleyl cholesteryl carbonate and cholesteryl chloride.

2. A thermometric composition according to claim 1 wherein said color change temperature is lowered by increasing the amount of cholesteryl acetate relative to said cholesteryl nonanoate, oleyl cholesteryl carbonate and cholesteryl chloride.

3. A thermometric composition according to claim 1 or 2, wherein said cholesteryl nonanoate, oleyl cholesteryl carbonate and cholesteryl chloride are maintained at an essentially constant concentration as the amount of cholesteryl acetate is changed.

4. A thermometric composition according to claim 1, wherein the concentration of cholesteryl acetate in said quaternary mixture varies from about 2.73% by weight to about 15.20% by weight.

5. A thermometric composition according to claim 1, wherein said cholesteryl nonanoate is present in an amount from about 15.91% by weight to about 29.05% by weight, said oleyl cholesteryl carbonate is present in an amount from about 49.20% by weight to about 63.12% by weight, said cholesteryl chloride is present in an amount from about 7.96% by weight to about 14.62% by weight, and said cholesteryl acetate is present in an amount from about 2.73% by weight to about 15.20% by weight.

6. A thermometric composition according to claim 1, wherein said quaternary mixture is one of the following compositions (a)–(f):

| | Percentage By Weight | | | |
|---|---|---|---|---|
| | CN | OCC | CCl | CAc |
| (a) | 29.05 | 53.61 | 14.62 | 2.73 |
| (b) | 28.66 | 52.89 | 14.43 | 4.04 |
| (c) | 28.12 | 51.89 | 14.16 | 5.85 |
| (d) | 27.65 | 51.03 | 13.92 | 7.43 |
| (e) | 27.39 | 50.56 | 13.79 | 9.11 |
| (f) | 26.66 | 49.20 | 13.42 | 10.74 | wherein
CN=cholesteryl nonanoate,
OCC=oleyl cholesteryl carbonate,
CCl=cholesteryl chloride, and
CAc=cholesteryl acetate 7. A thermometric composition according to claim 1, wherein said quaternary mixture is one of the following compositions (a)–(e):

| | Percentage By Weight | | | |
|---|---|---|---|---|
| | CN | OCC | CCl | CAc |
| (a) | 17.78 | 63.12 | 8.00 | 11.12 |
| (b) | 16.44 | 63.02 | 8.22 | 12.33 |
| (c) | 16.28 | 62.39 | 8.14 | 13.21 |
| (d) | 16.12 | 61.78 | 8.06 | 14.06 |
| (e) | 15.91 | 60.96 | 7.96 | 15.20 | wherein
CN=cholesteryl nonanoate,
OCC=oleyl cholesteryl carbonate,
CCl=cholesteryl chloride, and
CAc=cholesteryl acetate 8. A thermometric indicating device for indicating low temperatures in the range of 0° C. to −30° C., said device comprising:
 (a) a support having a surface; and
 (b) a thermometric composition as claimed in claim 1, 2, 3, 4, 5, 6 or 7, said composition being present on said surface of said support in microencapsulated form.

* * * * *